United States Patent Office 3,752,841
Patented Aug. 14, 1973

3,752,841
PROCESS FOR THE PREPARATION OF CARBAMATES OF ALKYLTHIOLHYDROXAMATES AND INTERMEDIATES
Julius J. Fuchs, Wilmington, Del., assignor to E. I. du Pont de Nemours and Company, Wilmington, Del.
No Drawing. Continuation-in-part of abandoned application Ser. No. 46,549, June 15, 1970. This application May 14, 1971, Ser. No. 143,667
Int. Cl. C07c 131/00, 121/02, 121/30
U.S. Cl. 260—453 R
10 Claims

ABSTRACT OF THE DISCLOSURE

Chlorination of aldoximes in a solvent containing at least 10% by weight of dimethylformamide (DMF) provides alkylhydroxamic acid chlorides in better yields than are obtained when the chlorination is carried out in water. In the same solvent, the alkylhydroxamic acid chlorides can be converted to alkylthiolhydroxamates by reaction with a mercaptan and base, and the alkylthiolhydroxamates can be converted to alkylthiolhydroxamate carbamates by reaction with isocyanic acid or methyl isocyanate. By this procedure both the intermediate alkylthiolhydroxamates and the final carbamates are obtained in higher yield than when the series of reactions are run in water alone. The carbamates are highly effective insecticides.

REFERENCE TO RELATED APPLICATION

This application is a continuation-in-part of my co-pending application Ser. No. 46,549, filed June 15, 1970, now abandoned.

BACKGROUND OF THE INVENTION

This invention relates to an improved process for the preparation of alkylthiolhydroxamate carbamate insecticides by a three-step process. More particularly, this invention is directed to methods of preparing the hydroxamate carbamates by chlorinating an aldoxime in a solvent containing at least 10% by weight of DMF, reacting the resultant alkylhydroxamic acid chloride with an alkyl mercaptan in the presence of a base, and then preparing the desired hydroxamate carbamates by reaction with either methyl isocyanate, optionally in the presence of a basic catalyst, or with isocyanic acid.

The first step relates to the preparation of hydroxamoyl chlorides and more particularly is directed to the chlorination of acetaldoxime, methoxyacetaldoxime and propionaldoxime. The preparation of hydroxamoyl chlorides is disclosed for example in Ber. 35, 3101 (1902) by Piloty and Steinbock, who prepared acetohydroxamoyl chloride by the chlorination of acetaldoxime in dilute, aqueous HCl solution to produce 1,1-chloronitrosoethane, a blue oil, which dimerized to a white solid material. The dimer thus prepared was then dissolved in an organic solvent, diethyl ether, in which a rearrangement to the hydroxamic acid chloride took place in a time period of about twelve hours at room temperature.

Such a procedure for the preparation of the hydroxamoyl chloride was improved by Wieland as shown in Ber. 40, 1676 (1907). However, the prior art procedures all possess the disadvantage that the chlorination of the oxime in aqueous HCl solution produces to a large extent the monomeric and dimeric chloronitrosoethane, both of which are water insoluble and must be brought into solution of an organic solvent to facilitate the rearrangement to the hydroxamoyl chloride.

More recently, British Pat. 1,105,879 and Belgian Pat. 706,958 disclose the preparation of alkylthiolhydroxamates by chlorination of aldoximes in an aqueous solution to form alkylhydroxamic acid chlorides, and subsequent reaction with methyl mercaptan and base.

The Belgian patent also discloses that yields can be improved by the use of lower chlorinating temperatures which, in turn, can be attained by depressing the freeze-point of the aqueous mixture via addition of a water-miscible organic solvent such as methanol, dioxane, or DMF.

U.S. Pat. 3,506,698 discloses the preparation of carbamates of alkylthiolhydroxamates by reacting an alkylthiolhydroxamate with a carbamylating agent selected from the group of isocyanic acid and its methyl ester. The reaction is carried out in aqueous medium at a temperature between about 0° C. and the boiling point of the reaction mass.

The yields of the carbamate final products and the intermediate alkylthiolhydroxamates are of course limited by the yields obtained in the initial chlorination step. In the manufacture of the intermediate methylthioacethydroxamate by chlorination of acetaldoxime to acethydroxamoylchloride in aqueous solution, using the best known conditions as disclosed in the above-mentioned Belgian patent, yields of the intermediate are only on the order of 80% based on aldoxime. Considerably lower yields are obtained by the processes of the Wieland and Piloty and Steinbock references.

SUMMARY OF THE INVENTION

I have now discovered that the chlorination of aldoximes in a solvent containing at least 10% by weight of DMF results in the formation of alkylhydroxamoyl chlorides in higher yields than are obtained when the reaction is carried out in water alone. The extent of the yield improvement depends upon the reaction temperature and the concentration of DMF in the solvent. When the chlorination is carried out in essentially pure (i.e. commercial grade) DMF, the yield of alkylhydroxamoyl chloride is almost quantitative even at temperatures as high as about 30° C. where the yield in water alone is very poor. Formation of by-product nitrosoalkane is virtually eliminated. When the solvent contains only 10% DMF, the yield improvement is much less pronounced, but is nevertheless discernible, as shown by data presented below.

After the chlorination reaction in the DMF-containing solvent, and without separation from the reaction medium, the alkylhydroxamoyl chloride can be reacted with an alkyl mercaptan and base to form the intermediate alkylthiolhydroxamate in higher yield than heretofore obtained in water alone. Finally, the alkylthiolhydroxamate, without prior isolation from the reaction medium, can be reacted with a carbamylating agent to yield the corresponding carbamate, again in higher yield than is obtained when the series of reactions are run in water alone.

The other organic liquids (dioxane and methanol) mentioned in Belgian Pat. 706,958 for depressing the freezing point of the aqueous chlorination reaction medium do not provide the yield improvement obtained by the use of DMF.

My invention therefore is an improved process for making insecticidal alkylthiolhydroxamate carbamates of the formula

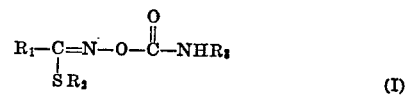

wherein
$R_1$ is methyl, methoxymethyl or ethyl;
$R_2$ is alkyl of 1 through 3 carbon atoms or cyanoethyl;
$R_3$ is hydrogen or methyl;

by the steps comprising (a) reacting an aldoxime of the formula $R_1$—CH=NOH with chlorine to produce an alkylhydroxamine acid chloride of the formula $$R_1-\underset{Cl}{\overset{}{C}}=NOH$$

(b) reacting the alkylhydroxamic acid chloride formed (a) with mercaptan of the formula $R_2$—SH and a base to produce an alkylthiolhydroxamate of the formula $$R_1-\underset{SR_2}{\overset{}{C}}=NOH$$

and (c) reacting the alkylthiolhydroxamate formed in (b) with a carbamylating agent selected from the group consisting of isocyanic acid and its methyl ester to produce the carbamate.

My invention also encompasses an improved process for making intermediate alkylthiolhydroxamates in accordance with steps (a) and (b) above, and in improved process for making alkylhydroxamic acid chlorides by step (a) above.

In each case, the improvement comprises carrying out each reaction in the presence of a solvent containing at least 10% by weight of dimethylformamide.

DESCRIPTION OF THE INVENTION

The process of this invention used in the preparation of the compounds of Formula 1 comprises the three steps enumerated above, and more fully described as follows:

Step (a).—The reaction of an aldoxime with chlorine is represented by the following equation:

$$R_1-CH=NOH + Cl_2 \rightarrow R_1-\underset{Cl}{\overset{}{C}}=NOH + HCl$$

in which $R_1$ is methyl, methoxymethyl or ethyl.

In this invention the chlorination is carried out in a solvent comprising at least 10% by weight of DMF. This results in higher yields of alkylhydroxamic acid chlorides than when water alone is used as a solvent. By preparing the desired hydroxamoyl chlorides in solvents containing DMF, the formation of by-products is minimized and the resulting product can be further processed without purification or separation.

The increased yields resulting from the use of even 10% dimethylformamide in water solvents are especially dramatic at the higher temperatures, e.g. 30° C., as can be seen from the data presented in Example 3 below. However, as shown by the data, discernible yield improvement is apparent even at —2° to —10° C. Yet another benefit is afforded at low temperatures by the increased rate of rearrangement of the intermediate monomeric and dimeric chloronitrosoethane to the hydroxamoyl chloride product, as compared to the use of water alone. Thus, solvents containing at least 10% by weight dimethylformamide are also promoters of the chlorination of aldoximes.

Although mixtures of 10% DMF in water give measureable benefits compared to water alone, mixtures containing at least 50% DMF are preferred, mixtures containing at least 90% DMF are more preferred, and most preferred are essentially pure (i.e. commercial grade) DMF.

Suitable aldoximes for use in the reaction of this invention are acetaldoxime, methoxyacetaldoxime, and propionaldoxime.

Amounts of aldoxime from about 1 to 50 weight percent based on the solvent will normally be used. It is preferred that the aldoxime be present in an amount of about 10 to 20 weight percent based on the solvent.

Greater amounts of solvent can of course be used, but such amounts merely dilute the components in the reaction mass with no particular advantages obtained.

The aldoximes will ordinarily be reacted with a stoichiometric quantity of chlorine, although the amounts of chlorine used can of course vary from stoichiometric by as much as plus or minus 20 percent. As will be well recognized by those skilled in the art, excess chlorine may result in overchlorination or may interfere in step (b) by reacting with the alkyl mercaptan to give alkyl disulfides and similarly a deficiency of chlorine will ordinarily cause underchlorination and leave some unreacted oxime, neither of which results in a benefit to yield. It is preferred that the amount of chlorine used vary from stoichiometric to plus or minus 5 percent, most preferred, plus or minus 1 percent. The time required to introduce the chlorine is not critical but is ordinarily kept to a minimum. Thus, the rate of chlorine addition will be determined by the cooling capacity of the system to maintain the desired reaction temperature. In most circumstances it is desirable to keep chlorine addition time as low as is practical.

The temperature range during reaction can be from 50° C. to —15° C. For best yields it is preferable to operate between —10° and 35° C. Thus, under optimum operating conditions, the temperature will ordinarily be below about 30° C., since, as shown by the data in Example 3, lower temperatures result in higher yields. However, the effect of temperature is much diminished in essentially pure dimethylformamide solvent.

The complete chlorination is indicated by the formation of a permanent yellow color. The reaction product can be used immediately or may be held for a short period of time. Normally such a hold time will be less than a few minutes and will very seldom exceed one hour.

The product of step (a) can be used directly in the process of step (b) without isolation or purification.

Step (b).—The hydroxamoyl chloride dissolved in the dimethylforamide-containing solvent and containing the stoichiometric amount of by-product HCl is reacted with a mercaptan and base according to the equation $$R_1-\underset{Cl}{\overset{}{C}}=NOH + HCl + R_2SH + 2MOH \longrightarrow$$

$$R_1-\underset{SR_2}{\overset{}{C}}=NOH + 2MCl + 2H_2O$$

in which $R_1$ is methyl, methoxymethyl or ethyl, $R_2$ is alkyl of from 1 through 3 carbon atoms or cyanoethyl, and M is sodium, lithium or potassium.

The reactants can be mixed in any order; however it is preferred that (1) the mercaptan be added to the reaction product of step (a) followed by the base or (2) that the reaction product of step (a) be added to a mixture of the mercaptan and base in dimethylformamide or containing solvent.

The temperature range during the reaction can be from 50° to —20° C. It is preferred to operate between 20° and —10° C. The hydroxamoyl chloride will be present in an amount of from about 5 to 25 weight percent based on the solvent. It is preferred that the hydoxamoyl chloride be present in an amount of from about 10 to 20 weight percent based on the solvent.

The hydroxamoyl chloride will ordinarily be reacted with a stoichiometric quantity of mercaptan, although the amounts of mercaptan used can of course vary from stoichiometric to plus or minus 10 percent. It is preferred that the amount of mercaptan used vary from stoichiometric to plus 5 percent.

The time required to mix the reactants is not critical but is ordinarily kept to a minimum. The rate of addition will be determined by the cooling capacity of the system to maintain the desired reaction temperature.

Step (c).—Step (c) comprises the reaction between the hydroxamate ester product of step (b) with a carbamylating agent selected from the group consisting of isocyanic acid and its methyl ester in accordance with the following equation:

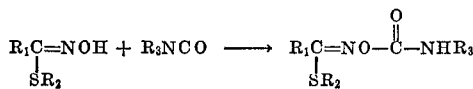

wherein $R_1$ is methyl, methoxymethyl or ethyl;
$R_2$ is alkyl of from 1 through 3 carbon atoms or cyanoethyl;
$R_3$ is hydrogen or methyl.

As mentioned previously, suitable carbamylating agents are isocyanic acid or methyl isocyanate. The carbamylating agent can be obtained commercially or it can be prepared by any of the suitable means well known to the art. If methyl isocyanate is to be used as a reactant it is preferred to remove the water that is present following step (b) before step (c) is undertaken. The water is normally removed by vacuum distillation such that the temperature of the reaction mixture remains below 100° C., and preferably below 75° C. If isocyanic acid is to be used as a reactant, normally the water is not removed.

Prior to step (c) the solvent can contain inorganic salts resulting from the synthesis of the thiolhydroxamate ester. For reasons of convenience, the inorganic salts are removed by filtration before undertaking step (c).

The concentration of the thiolhydroxamate esters in the solvent is not critical to the process of this invention. Extremely low concentrations are economically undesirable, and extremely high concentrations make agitaiton difficult if a slurry is present. Therefore, for reasons of convenience and economy, the thiolhydroxamate ester concentration will ordinarily range between 1 and 50 weight percent based on the solvent present. For reasons of optimum economy and operability a preferred concentration is between 10 and 20 weight percent based on the solvent present. Normally, the concentration of the thiolhydroxamate ester in the solvent will be controlled by the previous processing steps.

The carbamylating agent is generally used in an amount such that the mole ratio of carbamylating agent to thiolhydroxamate ester is between 1.0:1 and 1.4:1 with a preferred range of 1.0:1 to 1.2:1 moles of carbamylating agent per mole of thiolhydroxamate ester. Of course it is possible to operate outside these ranges and some advantages such as purity of product are attendant to operating with a mole ratio of less than 1.0:1. However, generally, for reasons of economy and convenience, the mole ratio will be in the range first mentioned above.

The reactants and solvent can be intermixed in any order; however, it is ordinarily preferred to introduce the carbamylating agent to the solution of the thiolhydroxamate ester in the dimethylformamide-containing solvent. When the carbamylating agent is methyl isocyanate it can be added directly to the reaction mass either as a liquid or as a gas. The reaction can be run in the presence of catalytic quantities of a compound selected from the group consisting of trimethylamine, triethylamine, triethylenediamine, or caustic soda.

When the carbamylating agent is isocyanic acid it can be added as isocyanic acid or it can be generated in situ by simultaneously adding to the reaction mass an alkali metal cyanate and a mineral acid, sufficient to maintain a pH of 1.5 to 5.0.

It is preferred that the isocyanic acid is generated in situ by concurrently adding an alkali metal cyanate, selected from a group consisting of potassium, sodium, or lithium cyanates, and a mineral acid, selected from a group consisting of hydrochloric and sulfuric acid.

The process is ordinarily operated at a temperature between −15° C. and 80° C. While reaction temperatures are not critical, as will be recognized by those skilled in the art, temperatures below 20° C. are inconvenient, requiring cooling equipment and involving higher operating costs. As a general rule the reaction temperature will range between 30° C. and 70° C., with a preferred temperature range of 40° C. to 60° C., when the carbamylating agent is isocyanic acid. When the carbamylating agent is methyl isocyanate, the preferred temperature range is between 20° C. and 60° C.

The reaction mass is ordinarily agitated during the addition of the reactants and until the reaction is completed. The intensity of agitation is not critical and only mild agitation is required. The products of the reaction can be used as produced in the dimethylformamide-containing solvent or they can be isolated by conventional procedures.

In a batch process, addition times for the carbamylating agent normally will range from about one-half hour or less to three hours or more depending on such factors as batch size and heat transfer area. Relatively short addition times are desirable. The reaction ordinarily proceeds quite rapidly and in a batch proces is generally essentially complete when the addition of the carbamylating agent is finished although hold periods of up to 30 minutes or more can be employed as desired.

As will be evident to those skilled in the art, the process of the three steps can be operated as a continuous process without departing from the concept of this invention.

In the examples which follow parts are by weight unless otherwise specified.

EXAMPLE 1

To a solution of 15 parts of acetaldoxime in 100 parts of commercial dimethylformamide are added with good agitation approximately 18 parts of chlorine over a period of 30 minutes at 20° C. The end point of the chlorination is indicated by a sudden change in color, from slight blue-green to the yellow color of excess, dissolved chlorine. The solution now contains acethydroxamoylchloride in essentially quantitative yield plus the corresponding equivalent of hydrogen chloride, and can be used as such for further reactions as indicated in Example 2.

EXAMPLE 2

The solution of acethydroxamoylchloride and hydrogen chloride in commercial dimethylformamide, as obtained in Example 1, is gradually added within 10 minutes to a mixture of 40 parts 50% aqueous sodium hydroxide and 26 parts of methylmercaptan in 100 parts of dimethylformamide at 30° C. The resulting slurry is then filtered and the NaCl-cake washed with DMF. Analysis of the combined filtrates shows the presence of 24.65 parts of methylthiolacethydroxamate, which represents a 90.3% yield on acetaldoxime across the two reaction steps.

EXAMPLE 3

To solutions, each having 15 parts of acetaldoxime in 100 parts of various dimethylformamide-water mixtures, is added at various temperatures (50° C., 30° C., −2 to −10° C.) approximately 18 parts chlorine each within 30 minutes. The end point of the chlorination is indicated when the yellow color of excess chlorine appears in the solution. The reaction mass is then cooled to −5° C. to 0° C. and 13 parts methylmercaptan added, followed by the addition of approximately 40 parts of 50% aqueous sodium hydroxide solution to give a final pH of 7. The resulting slurry is then filtered and the NaCl-cake washed with DMF. The combined filtrates are analyzed by gas chromatography for methylthiolacethydroxamate. The following table indicates the amounts and yields obtained at the various chlorinating temperatures.

| Solvent composition | | Chlorination temp., °C. | Methylthiolacethydroxamate | |
|---|---|---|---|---|
| Percent DMF, by weight | Percent H₂O, by weight | | Parts | Percent yield |
| 100 | 0 | 50 | 17.69 | 66.2 |
| 100 | 0 | 30 | 23.47 | 88.0 |
| 98 | 2 | 30 | 23.51 | 88.0 |
| 95 | 5 | 30 | 23.62 | 88.4 |
| 90 | 10 | 30 | 23.03 | 86.2 |
| 80 | 20 | 30 | 22.90 | 85.8 |
| 65 | 35 | 30 | 22.58 | 84.5 |
| 50 | 50 | 30 | 21.32 | 79.8 |
| 10 | 90 | 30 | 16.39 | 61.4 |
| 0 | 100 | 30 | 13.03 | 48.8 |
| 100 | 0 | −2 to −10 | 25.00 | 93.6 |
| 95 | 5 | −2 to −10 | 25.13 | 94.1 |
| 90 | 10 | −2 to −10 | 24.60 | 92.1 |
| 80 | 20 | −2 to −10 | 14.70 | 92.5 |
| 50 | 50 | −2 to −10 | 23.20 | 86.9 |
| 10 | 90 | −2 to −10 | 22.31 | 83.5 |
| 0 | 100 | −2 to −10 | 21.60 | 80.8 |

EXAMPLE 4

A solution of 29.5 parts of acetaldoxime in 200 parts of dimethylformamide is chlorinated at −10° C. with approximately 36 parts of chlorine until the yellow color of excess chlorine appears. To the resulting solution are then added at −10 to 0° C., 26 parts of methylmercaptan, followed by enough 50% aqueous sodium hydroxide to give a final pH of 7. The slurry thus obtained is filtered, the NaCl-cake washed with DMF, and the combined filtrates distilled at reduced pressure to remove the water which has been formed in the reaction and added with the caustic. Distillation is terminated when the head temperature has reached to boiling point of DMF (∼52° C./20 mm.). The pot residue is then cooled and additional NaCl removed by filtration. To the resulting filtrate are then added 0.5 part of triethylamine and 28 parts of methylisocyanate within 30 minutes at a maximum temperature of 40° C. When all of the methylisocyanate has been added, the reaction mixture is allowed to cool by itself to room temperature. Analysis of the resulting solution by liquid chromatography shows the presence of 74.36 parts of methyl O-(methylcarbamyl)thiolacethydroxamate, representing a 91.8% yield based on acetaldoxime.

EXAMPLE 5

A solution of 29.5 parts of acetaldoxime in 200 parts of dimethylformamide is chlorinated at 30° C. with approximately 36 parts of chlorine gas until the yellow color of excess chlorine appears. To the resulting solution are then added 26 parts of methylmercaptan at 0° C., followed by enough 50% aqueous sodium hydroxide to give a stable pH of 7. The sodium chloride is then filtered and the cake washed with DMF. The combined filtrates are then heated to 50° C. and the pH of the solution adjusted to 3 with 20° Baumé hydrochloric acid. During a period of 1 hour 35.7 parts of 91% sodium cyanate are added with good agitation at 50° C. while the pH is maintained at 3 by the simultaneous addition of 20° Baumé hydrochloric acid. After a hold period of 30 minutes at 50° C., during which time the pH is maintained at 3, the reaction mass is cooled to room temperature, filtered and the filter cake washed with DMF. The combined filtrates are evaporated at a reduced pressure and the residue triturated with water to dissolve a small amount of sodium chloride, leaving essentially pure methyl O-carbamylthiolacethydroxamate in 85% yield based on acetaldoximine.

EXAMPLES 6 TO 8

Example 4 is repeated substituting for the acetaldoxime and methylmercaptan equivalent amounts of the following aldoximes and mercaptans. Similar results are obtained.

| Example | Aldoxime | Mercaptan |
|---|---|---|
| 6 | Methoxyacetaldoxime | Propylmercaptan. |
| 7 | Propionaldoxime | Ethylmercaptan. |
| 8 | do | Cyanoethylmercaptan. |

I claim:
1. In the process for preparing alkylthiolhydroxamate carbamates of the formula

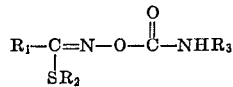

wherein $R_1$ is methyl, methoxymethyl or ethyl;
$R_2$ is alkyl of 1 through 3 carbon atoms or cyanoethyl;
$R_3$ is hydrogen or methyl;

by the steps comprising
(a) reacting an aldoxime of the formula $$R_1\text{---}CH=NOH$$

with chlorine at a temperature in the range of −15° C. to 50° C. to produce an alkylhydroxamic acid chloride of the formula

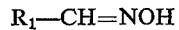

(b) reacting the alkylhydroxamic acid chloride formed in (a) with a mercaptan of the formula $R_2$—SH and a base selected from LiOH, KOH, and NaOH, at a temperature in the range of −20° C. to 50° C. to produce an alkylthiolhydroxamate of the formula

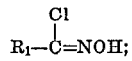

and (c) reacting the alkylthiolhydroxamate formed in (b) with a carbamylating agent selected from the group consisting of isocyanic acid and its methyl ester at a temperature in the range of −15° to 80° C. to produce the carbamate the improvement which comprises carrying out the reactions in an inert solvent containing at least 10% by weight of dimethylformamide.

2. Improved process of claim 1 wherein the solvent for step (a) is essentially pure dimethylformamide and step (b) is carried out in the reaction medium from step (a).

3. In the process for preparing an alkylthiolhydroxamate of the formula

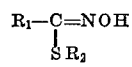

wherein $R_1$ is methyl, methoxymethyl, or ethyl;
$R_2$ is alkyl of 1 through 3 carbon atoms or cyanoethyl;

by the steps comprising
(a) reacting an aldoxime of the formula $R_1$—C=NOH with chlorine at a temperature in the range of −15° C. to produce an alkylhydroxamic acid chloride of the formula

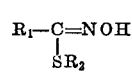

(b) reacting the alkylhydroxamic acid chloride formed in (a) with a mercaptan of the formula $R_2$—SH and a base selected from LiOH, KOH and NaOH, at a temperature in the range of −20° C. to 50° C. to produce the alkylthiolhydroxamate:

the improvement which comprises carrying out the reactions in an inert solvent containing at least 10% by weight of dimethylformamide.

4. Improved process of claim 3 wherein the solvent for step (a) is essentially pure dimethylformamide and step (b) is carried out in the reaction medium from step (a).

5. In the process for preparing alkylhydroxamic acid chlorides of the formula

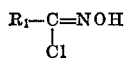

wherein $R_1$ is methyl, methoxymethyl, or ethyl, by reacting an aldoxime of the formula $R_1$—CH=NOH with chlorine at a temperature in the range of —15° C. to 50° C., the improvement which comprises carrying out the reaction in an inert solvent containing at least 10% by weight of dimethylformamide.

6. Improved process of claim 5 wherein the reaction is carried out at a temperature in the range of —10° C. to 35° C.

7. Improved process of claim 5 wherein the reaction is carried out at a temperature between 0° C. and 30° C.

8. Improved process of claim 7 wherein the solvent is at least 50% by weight of dimethylformamide.

9. Improved process of claim 6 wherein the solvent consists essentially of dimethylformamide.

10. Improved process of claim 7 wherein the solvent consists essentially of dimethylformamide.

References Cited

UNITED STATES PATENTS

| | | | |
|---|---|---|---|
| 3,522,287 | 7/1970 | Donninger et al. | 260—465.4 |
| 3,576,834 | 4/1971 | Buchanan | 260—566 AC X |
| 3,328,457 | 6/1967 | Payne, Jr. | 260—464 |
| 3,394,181 | 7/1968 | Bell | 260—465 EX |
| 3,452,033 | 6/1969 | Mooradian | 260—465 EX |
| 3,673,236 | 6/1972 | Brechbuhler et al. | 260—465.4 |

FOREIGN PATENTS

| | | | |
|---|---|---|---|
| 706,958 | 1/1968 | Belgium | 260—465.4 |

OTHER REFERENCES

DMF—dimethylformamide chemical uses. Kittila Ed. du Pont, Wilmington, Del. (1967), 2 unnumbered "Introduction" pages relied on.

JOSEPH P. BRUST, Primary Examiner

U.S. Cl. X.R.

260—465.4, 566 A, 566 AC